US012632274B2

(12) United States Patent
Overson et al.

(10) Patent No.: US 12,632,274 B2
(45) Date of Patent: May 19, 2026

(54) SYSTEMS AND METHODS FOR INTRA-APPLICATION ORCHESTRATION

(71) Applicant: Mimic Networks, Inc., Palo Alto, CA (US)

(72) Inventors: Jarrod Overson, Cary, NC (US); Fawad Shaikh, Marietta, GA (US); Philip Kedy, Oakton, VA (US)

(73) Assignee: MIMIC NETWORKS, INC., Palo Alto, CA (US)

( * ) Notice: Subject to any disclaimer, the term of this patent is extended or adjusted under 35 U.S.C. 154(b) by 0 days.

(21) Appl. No.: 18/169,874

(22) Filed: Feb. 15, 2023

(65) Prior Publication Data

US 2024/0272923 A1     Aug. 15, 2024

(51) Int. Cl.
*G06F 8/60* (2018.01)
*G06F 8/41* (2018.01)
*G06F 9/455* (2018.01)

(52) U.S. Cl.
CPC ............ *G06F 9/45508* (2013.01); *G06F 8/41* (2013.01)

(58) Field of Classification Search
CPC ....................................................... G06F 8/60
See application file for complete search history.

(56) References Cited

U.S. PATENT DOCUMENTS

| | | | |
|---|---|---|---|
| 2003/0159129 A1* | 8/2003 | Frank .................. | G06F 16/9577 717/110 |
| 2016/0057158 A1* | 2/2016 | Kumar ................ | H04L 63/1441 726/23 |
| 2018/0293060 A1* | 10/2018 | Behl .......................... | G06F 8/61 |
| 2020/0403859 A1* | 12/2020 | Balanescu ........... | H04L 41/0806 |
| 2021/0089348 A1* | 3/2021 | Jain ........................ | G06F 16/957 |
| 2021/0365481 A1* | 11/2021 | Chen ..................... | G06F 40/117 |
| 2023/0100873 A1* | 3/2023 | Galli ..................... | G06F 9/4484 718/104 |

* cited by examiner

*Primary Examiner* — Jae U Jeon
(74) *Attorney, Agent, or Firm* — Wei IP law

(57) ABSTRACT

Techniques are provided for dynamic network orchestration in a distributed runtime environment. A set of properties corresponding to a first computer system requesting an application is obtained. The application includes a plurality of components and a control flow configuration comprising a plurality of links. Based on the set of properties, a first assignment of the plurality of components to each of a plurality of computer systems including the first computer system is determined. One or more of a first plurality of components assigned to the first computer system is executed in a first runtime environment at a first server computer system. One or more of a second plurality of components assigned to a second server computer system is executed in a second runtime environment at a second server computer system. One or more of a third plurality of components assigned to a third computer system is executed in a third runtime environment at the first computer system.

18 Claims, 8 Drawing Sheets

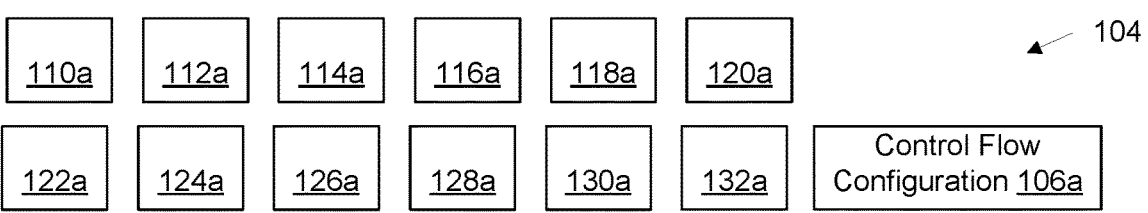
FIG. 1A
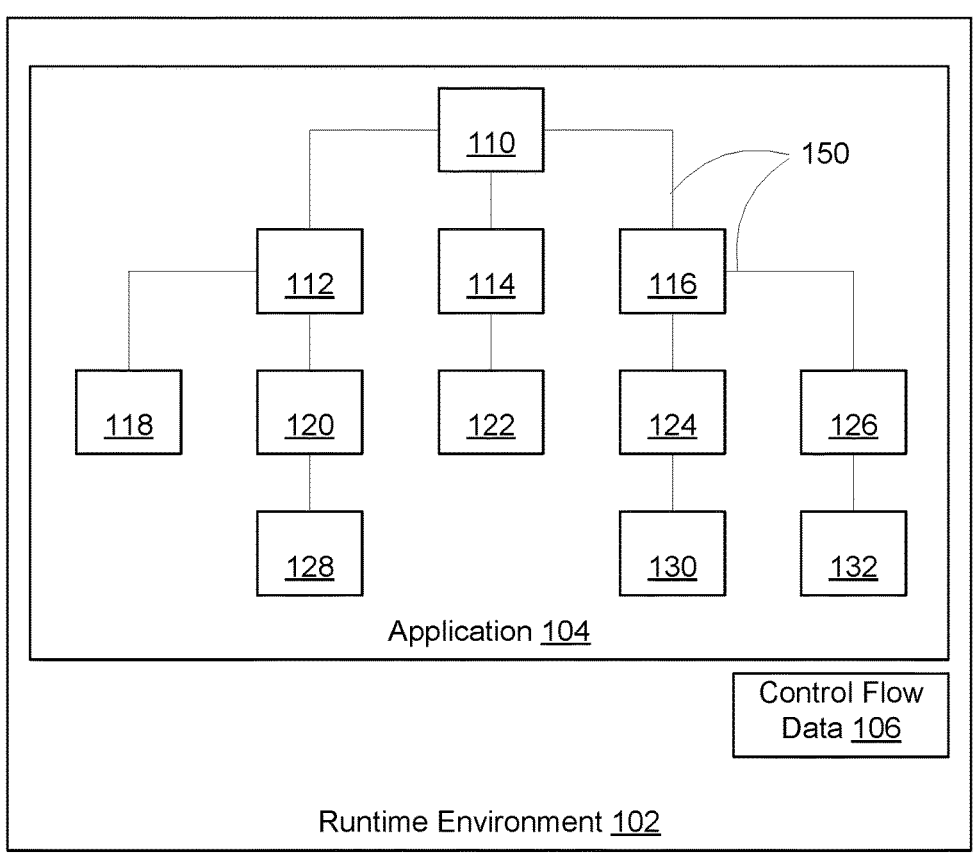
FIG. 1B
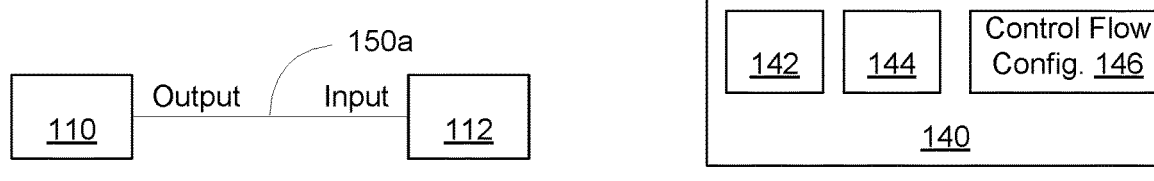
FIG. 1C                    FIG. 1D

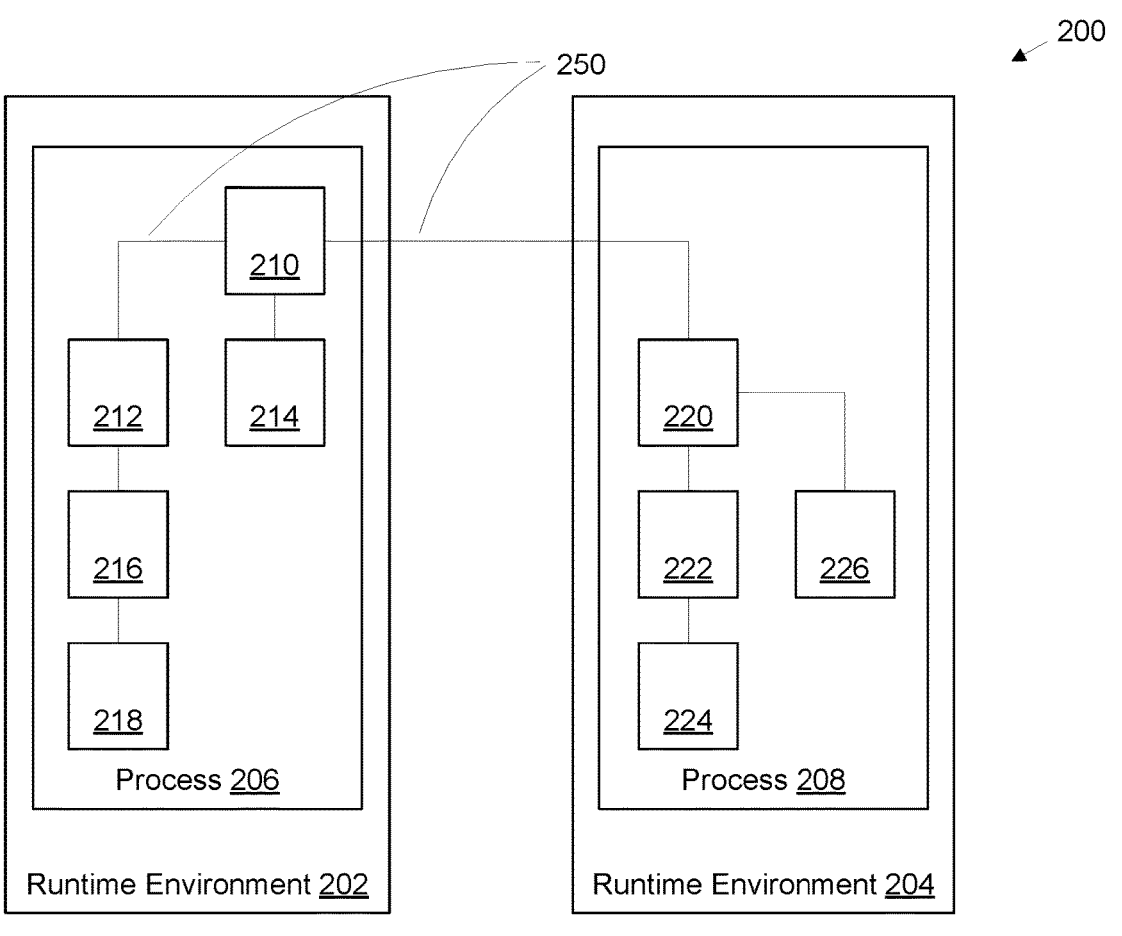
FIG. 2A
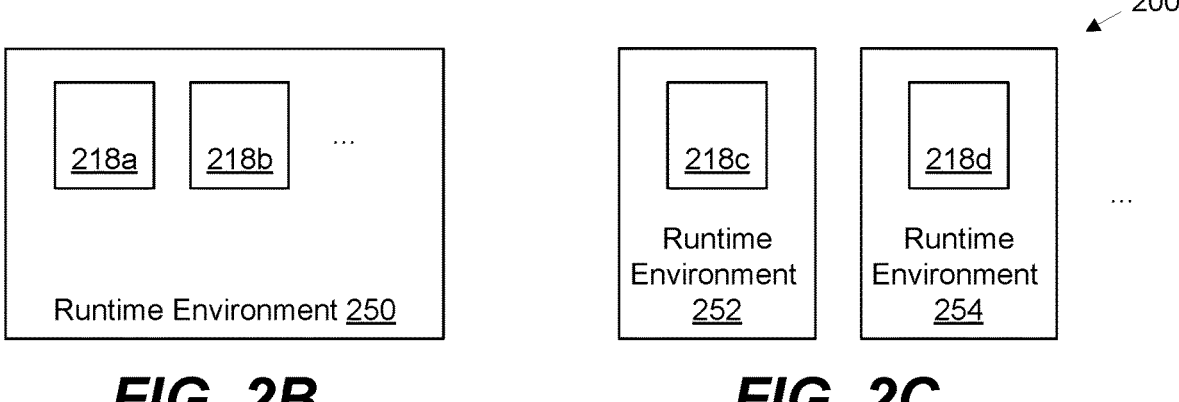
FIG. 2B        FIG. 2C

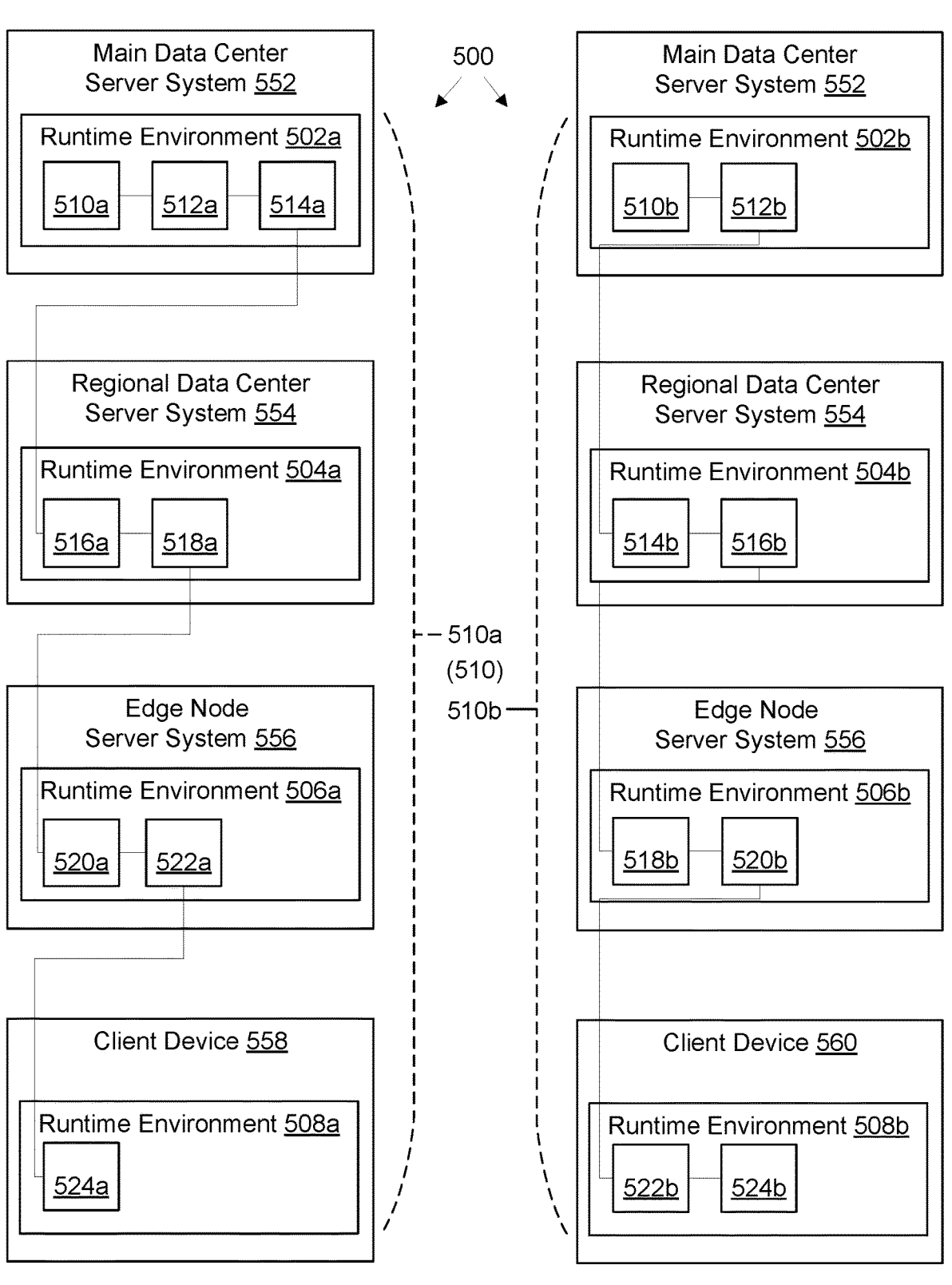
FIG. 5A            FIG. 5B

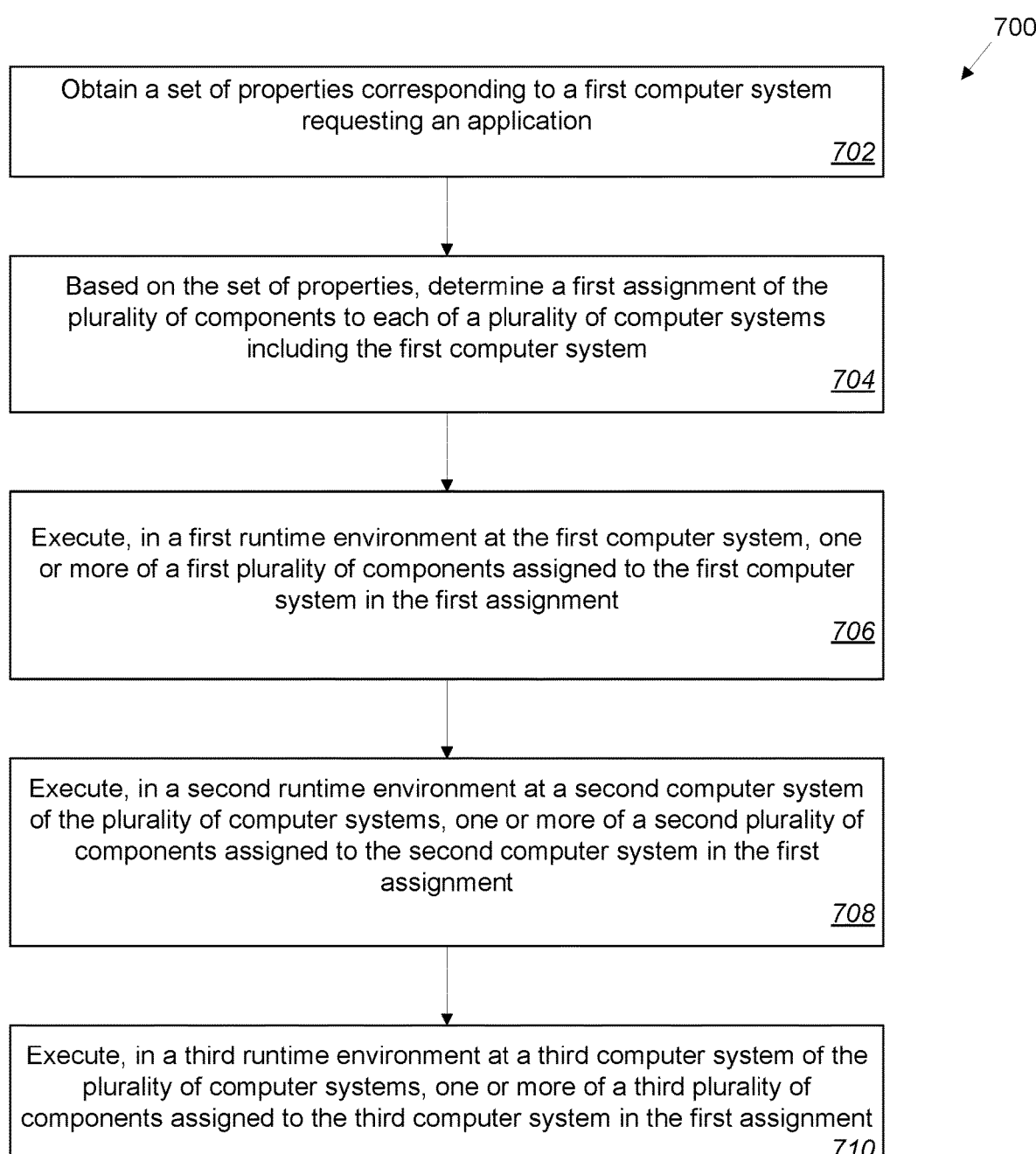

700

Obtain a set of properties corresponding to a first computer system requesting an application

*702*

Based on the set of properties, determine a first assignment of the plurality of components to each of a plurality of computer systems including the first computer system

*704*

Execute, in a first runtime environment at the first computer system, one or more of a first plurality of components assigned to the first computer system in the first assignment

*706*

Execute, in a second runtime environment at a second computer system of the plurality of computer systems, one or more of a second plurality of components assigned to the second computer system in the first assignment

*708*

Execute, in a third runtime environment at a third computer system of the plurality of computer systems, one or more of a third plurality of components assigned to the third computer system in the first assignment

SYSTEMS AND METHODS FOR INTRA-APPLICATION ORCHESTRATION

FIELD OF THE DISCLOSURE

The present disclosure generally relates to techniques applicable to executing application code on computer systems, and relates more specifically to techniques for intra-application network orchestration in a distributed runtime environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditionally, application developers create applications by writing code. Applications are often built using libraries, which are included in the application by additional lines of application code. The code that imports a library is an integral part of the application's code that permanently links the library to the application. For code that is compiled, the library code and application code may be compiled together to generate native instructions executable by a computer running the application. For code that is interpreted, the interpreter of a computer running the application integrates the corresponding library code, as instructed by the application code. While libraries reduce the complexity of creating applications, the integration of libraries into code and the corresponding applications still requires custom integration code and continued maintenance.

Abstraction has simplified the application development process in various ways. For example, virtualization at the hardware level and containerization at the operating system level have reduced the need to adapt code to specific hardware and/or operating systems. However, application developers still have to generate a large amount of custom code to implement the basic requirements for running and deploying an application in modern infrastructure. This is particularly true for applications deployed to clients over a network. There is a need for additional techniques to simplify application development.

SUMMARY

The appended claims may serve as a summary.

BRIEF DESCRIPTION OF THE DRAWINGS

In the drawings:

FIGS. 1A-1D are block diagrams illustrating an application comprising components executing in a runtime environment in an example embodiment.

FIGS. 2A-2C are block diagrams illustrating an application comprising components executable in a distributed runtime environment in an example embodiment.

FIGS. 5A-5B are block diagrams illustrating intra-application network orchestration in a distributed runtime environment executing across a computer system in an example embodiment.

FIG. 7 is a flow diagram of a process for executing an application in a distributed runtime environment in an example embodiment.

Figure 3:
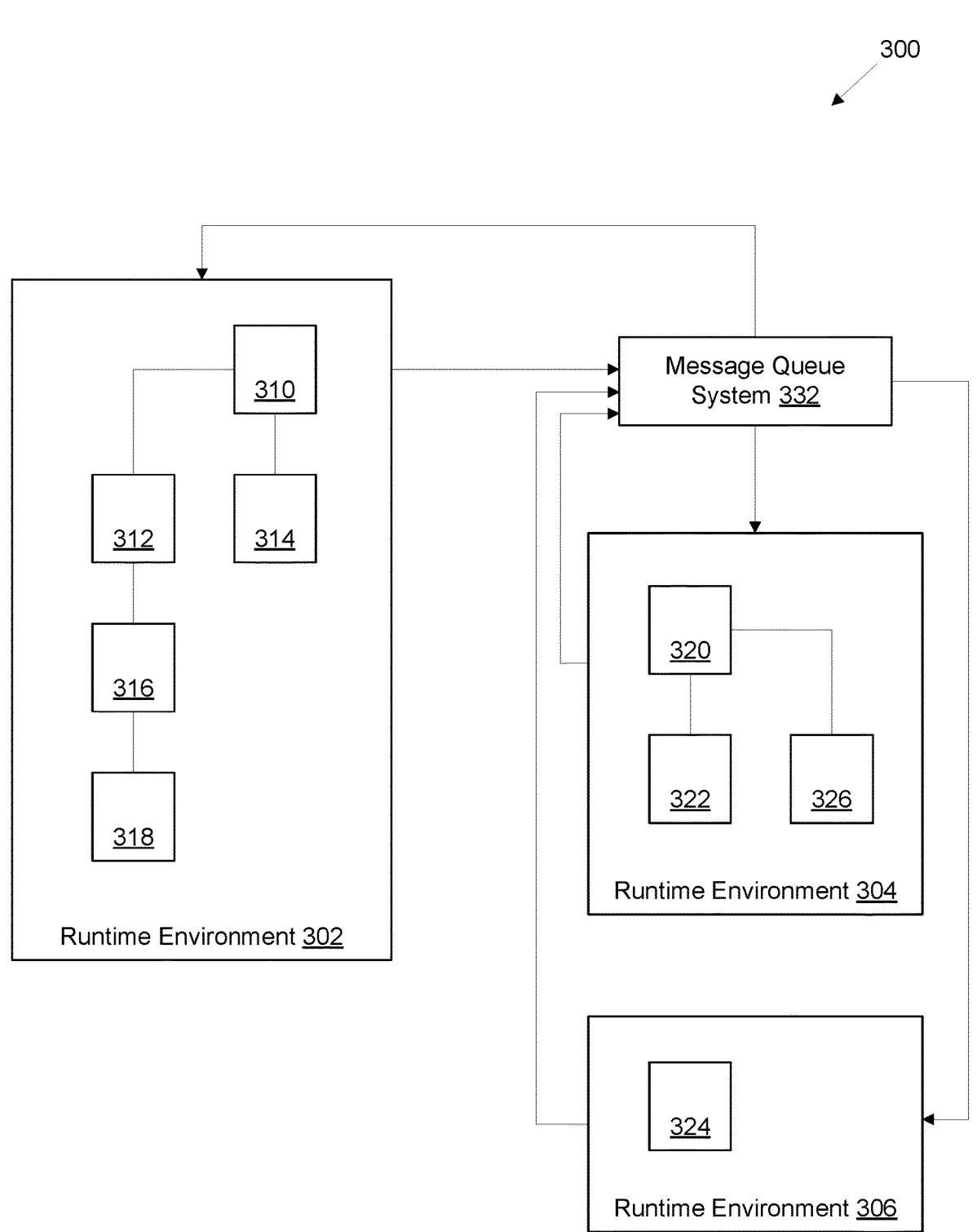
FIG. 3 is a block diagram illustrating a message queue system for use with an application comprising components executable in a distributed runtime environment in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures. However, using the particular arrangement illustrated in the other figure/s is not required in other embodiments.

DETAILED DESCRIPTION

In the following description, numerous specific details are set forth in order to provide a thorough understanding of the present invention. It will be apparent, however, that the present invention may be practiced without these specific details. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

A "computer system" refers to one or more computers, such as one or more physical computers, virtual computers, and/or computing devices. For example, a computer system may be, or may include, one or more server computers, desktop computers, laptop computers, mobile devices, special-purpose computing devices with a processor, cloud-based computers, cloud-based cluster of computers, virtual machine instances, and/or other computing devices. A computer system may include another computer system, and a computing device may belong to two or more computer systems. Any reference to a "computer system" may mean one or more computers, unless expressly stated otherwise. When a computer system performs an action, the action is performed by one or more computers of the computer system.

A "device" may be a computer system, hardware, and/or software stored in, or coupled to, a memory and/or one or more processors on one or more computers. Additionally or alternatively, a device may comprise specialized circuitry. For example, a device may be hardwired or persistently programmed to support a set of instructions to perform the functions discussed herein. A device may be a standalone element, work in conjunction with one or more other devices, contain one or more other devices, and/or belong to one or more other devices.

A "client" refers to a combination of integrated software elements and an allocation of computational resources, such as memory, a computing device, and/or processes on a computing device for executing the integrated software elements. The combination of the software and computational resources is configured to interact with one or more servers over a network, such as the Internet. A client may refer to either the combination of elements on one or more computers, or the one or more computers having the elements (also referred to as "client computing device/s").

A "server" refers to a combination of integrated software elements and an allocation of computational resources, such as memory, a computing device, and/or processes on the computing device for executing the integrated software elements. The combination of the software and computational resources is dedicated to providing a particular type of function on behalf of clients of the server. A server may refer to either the combination of elements on one or more computing devices, or the one or more computing devices having the elements (also referred to as "server system" or "server computer system"). A server system may include multiple servers; that is, a server system may include a first computing device and a second computing device, which may provide the same or different functionality to the same or different set of clients.

General Overview

This document generally describes systems, methods, devices, and other techniques for intra-application orchestration. In general, a framework is provided for developing and/or executing an application as a plurality of components. A distributed runtime environment executes instances of the components and manages communication and/or other dependencies between components of the application. The distributed runtime environment can execute the component instances of an application in multiple runtime environments. The multiple runtime environments may run on the same or different computing devices and/or computer systems, and may run at the same or different network locations. For example, the multiple runtime environments may run on multiple server systems and/or client devices. The distributed runtime environment may distribute the components across a plurality of runtime environments without requiring any changes to components of the application, such as rewriting and/or recompiling the underlying code and/or control flow configuration.

In some examples, the distributed runtime environment may perform load balancing and/or network orchestration within the application. For example, the distributed runtime environment may determine how to distribute the components across multiple runtime environments. As an addition or alternative, the distributed runtime environment may determine specific computer system/s and/or network location/s at which to run one or more runtime environments that will execute instances of components of the application. As an addition or alternative, the distributed runtime environment may determine to execute one or multiple instances of a particular component, or a set of components. The distributed runtime environment may make one or more of these decisions before executing the application and/or during the execution of the application. The distributed runtime environment may make and/or carry out such determinations without requiring any changes to components of the application, such as rewriting and/or recompiling the underlying code and/or control flow configuration.

In some examples, the distributed runtime environment includes a plurality of runtime environments running at computer systems arranged in an edge computing architecture. In some examples, the distributed runtime environment performs network orchestration by determining how to distribute the execution of an application's components across multiple computer systems, such as but not limited to a plurality of server systems and a client device, such as in response to a request from the client device to access the application. The distributed runtime environment may distribute component instances across runtime environments on a per-client basis. For example, the distributed runtime environment may distribute component execution based on one or more properties of a client device requesting to access the application.

One or more aspects of the disclosure are directed to a method for executing an application in a distributed runtime environment, the method comprising: obtaining a set of properties corresponding to a first computer system requesting an application, the application comprising a plurality of components and a control flow configuration comprising a plurality of links, each link describing a connection between two or more components of the plurality of components; based on the set of properties, determining a first assignment of the plurality of components to each of a plurality of computer systems including the first computer system; executing, in a first runtime environment at the first computer system, one or more of a first plurality of components assigned to the first computer system in the first assignment; executing, in a second runtime environment at a second computer system of the plurality of computer systems, one or more of a second plurality of components assigned to the second computer system in the first assignment; and executing, in a third runtime environment at a third computer system of the plurality of computer systems, one or more of a third plurality of components assigned to the third computer system in the first assignment; wherein the method is performed by one or more processors.

In some examples, the method further includes executing, in one or more additional runtime environments at one or more additional computer systems of the plurality of computer systems, a respective subset of the plurality of components assigned to the respective computer system of the one or more additional computer systems in the first assignment.

In some examples, the second computer system is a client device.

In some examples, the method further includes: determining a second set of properties corresponding to a second client device requesting the application; based on the second set of properties, determining a second assignment of the plurality of components to each of a second plurality of computer systems including the second client device, the second computer system, and the third computer system; executing, in a fourth runtime environment at the second client device, a fourth subset of the plurality of components assigned to the second client device in the second assignment; executing, in a fifth runtime environment at the second computer system, a fifth subset of the plurality of components assigned to the second computer system in the second assignment; and executing, in a sixth runtime environment at the third computer system, a sixth subset of the plurality of components assigned to the third computer system in the second assignment. As an addition or alternative, the fourth runtime environment may be the first runtime environment and the fifth runtime environment may be the second runtime environment.

In some examples, determining the first assignment is based on analyzing the control flow configuration of the application.

In some examples, the set of properties includes one or more resource metrics describing one or more computational resources of the first computer system; and determining the first assignment is based on the one or more resource metrics.

In some examples, the set of properties includes a user-agent string; and determining the first assignment is based on the user-agent string.

In some examples, the plurality of components comprises at least one of: a plurality of WebAssembly modules in a WebAssembly binary format; a plurality of WebAssembly components; and a plurality of fractional parts of WebAssembly binaries.

In some examples, each link identifies a first component of the plurality of components, an output of the first component, a second component, and an input of the second component of the plurality of components.

One or more aspects of the disclosure are directed to a non-transitory computer-readable medium storing instructions that, when executed by one or more processors, cause the one or more processors to: obtain a set of properties corresponding to a first computer system requesting an application, the application comprising a plurality of components and a control flow configuration comprising a plurality of links, each link describing a connection between two or more components of the plurality of components; based on the set of properties, determine a first assignment of the plurality of components to each of a plurality of computer systems including the first computer system; trigger execution of, in a first runtime environment at the first computer system, one or more of a first plurality of components assigned to the first computer system in the first assignment; trigger execution of, in a second runtime environment at a second computer system of the plurality of computer systems, one or more of a second plurality of components assigned to the second computer system in the first assignment; and trigger execution of, in a third runtime environment at a third computer system of the plurality of computer systems, one or more of a third plurality of components assigned to the third computer system in the first assignment.

In some examples, the instructions, when executed by the one or more processors, cause the one or more processors to trigger execution of, in one or more additional runtime environments at one or more additional computer systems of the plurality of computer systems, a respective subset of the plurality of components assigned to the respective computer system of the one or more additional computer systems in the first assignment.

In some examples, the second computer system is a client device.

In some examples, the instructions, when executed by the one or more processors, cause the one or more processors to: obtain a second set of properties corresponding to a second client device requesting the application; based on the second set of properties, determine a second assignment of the plurality of components to each of a second plurality of server computer systems including the second client device, the second computer system, and the third computer system; trigger execution of, in a fourth runtime environment at the second client device, a fourth subset of the plurality of components assigned to the second client device in the second assignment; trigger execution of, in a fifth runtime environment at the second computer system, a fifth subset of the plurality of components assigned to the second computer system in the second assignment; and trigger execution of, in a sixth runtime environment at the third computer system, a sixth subset of the plurality of components assigned to the third computer system in the second assignment. As an addition or alternative, the fourth runtime environment may be the first runtime environment and the fifth runtime environment may be the second runtime environment.

In some examples, determining the first assignment is based on analyzing the control flow configuration of the application.

In some examples, the set of properties includes one or more resource metrics describing one or more computational resources of the first computer system; and determining the first assignment is based on the one or more resource metrics.

In some examples, the set of properties includes a user-agent string; and determining the first assignment is based on the user-agent string.

In some examples, the plurality of components comprises at least one of: a plurality of WebAssembly modules in a binary format; a plurality of WebAssembly modules in a WebAssembly binary format; a plurality of WebAssembly components; and a plurality of fractional parts of WebAssembly binaries.

In some examples, each link identifies a first component of the plurality of components, an output of the first component, a second component, and an input of the second component of the plurality of components.

In some implementations, the various techniques described herein may achieve one or more of the following advantages: duplicative programming effort is reduced and/or eliminated; application development is streamlined; coding and compiling efforts are reduced and/or eliminated; a distributed runtime environment automatically scales components of an application without requiring additional changes to the application; scaling components of an application may be performed on a function and/or component level of the application; a distributed runtime environment automatically performs local load balancing for an application without requiring additional changes to the application; a distributed runtime environment automatically performs global load balancing for an application without requiring additional changes to the application; a distributed runtime environment automatically handles messaging between components of an application without requiring additional changes to the application; a distributed runtime environment automatically performs dynamic intra-application network orchestration without requiring additional changes to the application; intra-application network orchestration is optimized and automated. Additional features and advantages are apparent from the specification and the drawings.

Application

FIGS. 1A-1D are block diagrams illustrating an application comprising components executing in a runtime environment in an example embodiment. FIG. 1A is a block diagram illustrating an application executing in a runtime environment in an example embodiment. An application 104 includes a set of components 110a-132a and a control flow configuration 106a that links the components 110a-132a. A component 110a-132a includes a set of application logic that is executing in a runtime environment 102. For example, one or more components 110a-132a may include machine code that can be directly handled by a processor. Machine code generated from a compiled language is typically faster and more efficient to execute than interpreted code written in an interpreted language. In some examples, each component 110*a*-132*a* of the application 104 includes machine code, and may be a single set of machine code.

In some examples, the components 110*a*-132 include one or more WebAssembly modules in the WebAssembly binary format. A WebAssembly module may be generated by compiling code written in any programming language that has a corresponding compiler toolchain to compile the code into the WebAssembly modules, such as but not limited to C/C++, C #, Rust, Go, Kotlin, and Swift.

Typically, WebAssembly modules can run in a browser, such as by writing a JavaScript code wrapper that calls the functions exportable from the WebAssembly modules. Additional HTML code is also required. Thus, typical usage of WebAssembly modules requires the developer to write and maintain additional code that accesses the WebAssembly modules. In some examples, each component 110*a*-132*a* of the application 104 includes a WebAssembly module, and may be a single WebAssembly module.

In some examples, one or more components 110*a*-132*a* of the application are atomic components. An atomic component is the smallest unit of application logic that a runtime environment is configured to execute in one or more frameworks described herein. For example, a developer may generate code corresponding to a function and generate an atomic component, such as by compiling the function code into a WebAssembly Module. As an alternative or addition, one or more components are collection components that combine atomic components and/or other collection components. Collection components are described in greater detail hereinafter. In some examples, one or more components 110*a*-132*a* may be dynamically generated for an application 104. In some examples, a particular component (and/or component instance) may be divided into two or more individual components (and/or component instances). As an alternative or addition, two or more components (and/or component instances) may be combined into one component. In some examples, components 110*a*-132*a* and/ or component instances 110-132 may be created and/or reconfigured during runtime. For example, a runtime environment 102 may dynamically reconfigure the application 104 into components 110*a*-132*a* and/or component instances 110-132.

The control flow configuration 106*a* of the application 104 describes how the components 110*a*-132*a* are connected with in the context of the application 104. The control flow configuration 106*a* describes one or more relationships between the components 110*a*-132*a*, such as connection, communication, execution flow, dependencies, and/or other relationships. In some examples, the control flow configuration 106*a* specifies the flow of data between components 110*a*-132*a* in the application 104. In some examples, the control flow configuration 106*a* describes a plurality of links 150 between components 110*a*-132*a*. Each link 150 may specify a relationship between components 110*a*-132*a*, such as connection, communication, execution flow, dependencies, and/or other relationships. In some examples, each link 150 describes communication between two or more components 110*a*-132*a* of the application 104.

FIG. 1B is a block diagram illustrating an application comprising linked component instances executing in a runtime environment in an example embodiment. A component instance 110-132 refers to one occurrence of a component 110*a*-132*a* that is executed in a runtime environment 102. In some examples, executing the application 104 in a runtime environment 102 includes executing at least one component instance 110-132 of each component 110*a*-132*a* of the application 104 in the runtime environment 102.

The runtime environment 102 is a subsystem that supports the execution of one or more programs and/or processes, including one or more component instances 110-132. The runtime environment 102 typically manages data and resources required for the execution of the program/s and/or processes, including state information. For example, the runtime environment 102 may address aspects of the execution of the component instances 110-132, such as management of application memory, how the program accesses variables, mechanisms for passing parameters between procedures, interfacing with the underlying operating system, heap creation and management, garbage collection, multithreading, communication, networking, and/or other aspects.

The runtime environment 102 includes control flow data 106 that describes a relationship between the component instances 110-132, such as connection, communication, execution flow, dependencies, and/or other relationships. In some examples, the runtime environment 102 loads and/or processes the control flow configuration 106*a* of the application to create the control flow data 106 in memory. The runtime environment 102 may be configured to use the control flow data to manage connections, communication, execution flow, dependencies, and/or other aspects of the components 110*a*-132*a* and/or the component instances 110-132.

In some examples, the runtime environment 102 controls the execution flow of component instances 110-132 of the application 104 based on the control flow data 106. For example, the runtime environment 102 may execute one or more component instances 110-132 in response to a communication from another component instance 110-132. As an alternative or addition, the runtime environment 102 may execute one or more component instances 110-132 that wait for a communication from another component instance 110-132 and act on the communication when the communication is received and/or when the runtime environment 102 causes the component instance 110-132 to act on the communication. In some examples, the runtime environment 102 is configured to execute WebAssembly modules corresponding to components 110*a*-132*a* as WebAssembly instance objects.

In some examples, the components 110-132*a* include a plurality of WebAssembly modules in a WebAssembly binary format. As an alternative or addition, the components 110-132*a* may include a plurality of WebAssembly components. An emerging standard (referred to in the community as the "WebAssembly Component Model" or just "Component Model") defines a WebAssembly component as a part of a new subsection of a WebAssembly module. WebAssembly Components may be considered analogous to programming language libraries. For example, they may export and import strictly typed interfaces and can be stitched together as part of a larger WebAssembly module. The parent WebAssembly module may be akin to the "main" entrypoint for execution in a language like C or Go. As an alternative or addition, the components 110-132*a* include a plurality of fractional parts of WebAssembly binaries. For example, the control flow configuration may be dynamically compiled into WebAssembly to generate a partial, ad hoc implementation of the engine with slots for component logic to exist. Components that would have been orchestrated by the current runtime engine may be dynamically stripped of interface or adapter logic and added directly to the ad hoc engine binary.

The runtime environment 102 may execute the application 104 and/or component instance/s 110-132 thereof in one or more forms, such as a web server, microservice, worker, dataflow node, library for another application and/or component instance, command line interface application, client application, or any other form. In some examples, the runtime environment 102 may execute the application 104 and/or components instances 110-132 thereof in two or more different forms without requiring any changes to components 110a-132a of the application 104, such as rewriting and/or recompiling the underlying code. As an addition or alternative, the runtime environment 100 may be configured to support execution of the application 104 and/or components instances 110-132 thereof in two or more different forms without requiring any changes to the control flow configuration 106a of the application 104.

In some examples, the runtime environment 102 implements a communication protocol between components that handles communications between component instances 110-32, whether the component instances 110-132 are executing in the same runtime environment 102 or different runtime environments. The communication protocol may handle communication with one or more other runtime environments even when the other runtime environment/s run on different computer systems, computing devices, and/or network locations. In some examples, the runtime environment 102 is configured to handle communication between component instances 110-132 of an application 104 in the various configurations described herein without requiring any changes to components of the application 104, such as rewriting and/or recompiling the underlying code. As an addition or alternative, the runtime environment 102 may be configured to support such communications without requiring any changes to the control flow configuration 106a of the application 104.

FIG. 1C is a block diagram illustrating a link between component instances in an example embodiment. A link 150a connects component instance 112 to component instance 120. The link 150a may be one of a plurality of links 150 described by the control flow data 106 and/or the control flow configuration 106a corresponding to the application 104. In some examples, the link 150a indicates that an output of component instance 112 will be an input of component instance 112 when the application 104 executes in the runtime environment 102. For example, when the runtime environment 102 executes the application 104, the runtime environment 102 may execute an instance of component 112a (e.g., component instance 112), execute an instance of component 120a (e.g., component instance 120), and direct an output of component instance 112 as input to component instance 120 in accordance with the control flow configuration 106a of the application 104.

In some examples, one or more links 150 of FIG. 1B may identify a first component instance of the plurality of component instances 110-132, an output of the first component instance, a second component instance of the plurality of components 110-132, and an input of the second component instance. In some examples, the control flow configuration 106a, control flow data 106, and/or links 150 are configured based on custom and/or standard Application Binary Interface (ABI) protocols, such as but not limited to the Web Assembly Procedure Call standard (WaPC) or Reactive Streams for WebAssembly (WasmRS) for communication between WebAssembly modules and/or instances thereof.

In some examples, each component 110a-132a is configured to have one or more input and/or one or more outputs. An input may represent any data type, one or more strings, integers, floats, characters, booleans, arrays, sets, other groupings, and/or other data types, including objects and/or other data structures.

While an output of a first component instance 110 and an input of a second component instance 112 are described with respect to FIG. 1C, a link 150 may indicate that one or multiple outputs of an instance of a first component are directed to one or multiple inputs of an instance of a second component. As an alternative or addition, a link 150 may indicate a more complex relationship between more than two components and/or instances thereof. As an alternative or addition, when a runtime environment 102 executes multiple instances of the same component, a link 150 may indicate a relationship involving the multiple instances, examples of which are described in greater detail hereinafter. As an alternative or addition, one or more component instances 110a-132a may execute in the same runtime environment 102 and/or different runtime environments, such as a plurality of runtime environments of a distributed runtime environment, examples of which are described in greater detail hereinafter.

In some examples, each component instance 110-132 is, by default, sandboxed. For example, the dependencies of a component instance 110-132 may be restricted to the component instance 110-132 and a standardized interface for inputs and/or outputs from another component instance 110-132. As another example, the memory for a component instance 110-132 may be restricted to an allocated memory by the runtime environment 102. As another example, a component instance 110-132 may be restricted to a process and/or other compute resource/s specifically allocated by the runtime environment 102.

FIG. 1D illustrates a collection component that includes two or more components. A collection component 140 includes a plurality of components 142-144 that are linked by a control flow configuration 146 of the collection component 140. In some examples, the components 142-144 of the collection component 140 may include one or more atomic components. As an addition or alternative, the components 142-144 of the collection component 140 may include one or more collection components.

The control flow configuration 146 of the collection component 140 describes how the components 142-144 of the collection component 140 are connected in the context of the collection component 140. The control flow configuration 146 describes one or more relationships between the components 142-144, such as connection, communication, execution flow, dependencies, and/or other relationships. In some examples, the control flow configuration 146 specifies the flow of data between components 142-144 in the collection component 140. In some examples, the control flow configuration 146 may include a plurality of links between components 142-144. Each link may describe a relationship between components 142-144, such as connection, communication, execution flow, dependencies, and/or other relationships. In some examples, each link of the control flow configuration 146 describes communication between two or more components 142-144 of the collection component 140. The control flow configuration 146 of the collection component 140 may use the same, similar, or different syntax and/or other format as the control flow configuration 146 of the application 104.

The collection component 140 may be configured to have one or more input and/or one or more outputs. In some examples, the control flow configuration 146 of the collection component 140 may indicate that a particular component 142 is the input component for the collection component 140. For example, an input to the collection component 140 may be treated as an input for its input component 142. As an alternative or addition, the control flow configuration associated with the collection component 140 may indicate that a particular component 144 is the output component for the collection component 140. For example, an output of the output component 144 may be treated as the output of the collection component 140.

Distributed Runtime Environment

In some examples, a distributed runtime environment is provided for executing component instances corresponding to the components of applications. FIGS. 2A-2C are block diagrams illustrating an application comprising components executable in a distributed runtime environment in an example embodiment. One or more elements of FIGS. 2A-2C may have one or multiple properties of the elements described with respect to one or more other figures, such as but not limited to FIGS. 1A-1D.

FIG. 2A is a block diagram illustrating an application comprising components executable in a distributed runtime environment in an example embodiment. The distributed runtime environment 200 includes a plurality of runtime environments 202-204 that execute component instances 210-226 of an application. The component instances 210-226 correspond to components of an application. The distributed runtime environment 200 is configured to manage links 250 that describe connections, communication, execution flow, dependencies, and/or other aspects of the component instances 210-226 in accordance with the control flow configuration of the application.

When an action is described herein as performed by or to a distributed runtime environment (e.g., distributed runtime environment 200), the action may be performed by or to one or more runtime environments (e.g., runtime environments 202-204) of the distributed runtime environment. The runtime environments of a distributed runtime environment may be isolated and self-contained. In some examples, the runtime environments of a distributed runtime environment may communicate to function as a cluster, but operate independently from the other runtime environment/s. For example, the runtime environments of the distributed runtime environment may each implement a communication protocol that handles communications between component instances (e.g., component instances 210-226), whether the component instances are executing in the same runtime environment or across different runtime environments.

A first runtime environment 202 includes a first process 206 that executes one or more of a first plurality of the component instances 210-218 of the application that are assigned to the first runtime environment 202. A second runtime environment 204 includes a second process 208 that executes one or more of a second plurality of the component instances 220-226 of the application that are assigned to the second runtime environment 204. The distributed runtime environment 200 may make the determination to split the execution of the application across multiple runtime environments 202-204. The distributed runtime environment 200 may make the determination before executing the application and/or during the execution of the application. The component instances 210-224 are distributed across the stack of the distributed runtime environments 202-204. In some examples, one or more component instances 210-226 of the application do not execute at a particular time. For example, a particular execution of the application may involve the execution of a subset of the component instances 210-226 across the distributed runtime environments 202-224, while one or more of the component instances 210-226 are not executed.

In some examples, the distributed runtime environment 200 determines one or multiple aspects regarding how the component instances 210-226 of the application are distributed across the distributed runtime environment 200, such as but not limited to how many runtime environments will execute the application, how to distribute the component instances 210-226 of the application across the plurality of runtime environments 202-204, where to run one or more of the runtime environments 202-204 of the distributed runtime environment 200 (e.g., a network location, computer system, and/or computing device), and/or any other aspect regarding how the application is distributed across the distributed runtime environment 200.

The distributed runtime environment 200 may make and/or carry out any of these determinations before executing the application and/or during the execution of the application. In some examples, the distributed runtime environment 200 monitors one or more metrics related to the execution of the application and/or its components, such as time metrics, performance metrics, resource metrics, network metrics, error metrics, and/or other metrics. The distributed runtime environment 200 may dynamically make and/or carry out a determination to change how the application is distributed across the distributed runtime environment 200 during execution based on the one or more metrics.

In some examples, the distributed runtime environment 200 may split the application by component such that a subset of components are assigned to each runtime environment 204. The application may be split at a link between component instance, as shown with respect to component instance 210 and component instance 220. As an addition or alternative, when an application includes a collection component (e.g., collection component 140), the distributed runtime environment 200 may split the components belonging to the collection component such that components of the collection component may be assigned to different runtime environments 202-204.

In some examples, the distributed runtime environment 200 handles communications between any linked components, whether the linked components are executing on the same or different runtime environment 202-204 of the distributed runtime environment 200. For example, the distributed runtime environment 200 may implement a communication protocol between components that handles communications between component instances 210-226. In some examples, the distributed runtime environment 200 is configured to handle communications between component instances 210-226 in accordance with custom and/or standard Application Binary Interface (ABI) protocols, such as but not limited to the Web Assembly Procedure Call standard (WaPC) or Reactive Streams for WebAssembly (WasmRS) for communication between Web Assembly modules and/or instances thereof.

The distributed runtime environment 200 may be configured to support application splitting without requiring any changes to the application, such as rewriting and/or recompiling the underlying code. As an addition or alternative, the distributed runtime environment 200 may be configured to support application splitting without requiring any changes to the control flow configuration of the application.

While one process 206-208 is shown in each runtime environment 202-204, a runtime environment 202-204 may execute the respective component instances 210-226 of the application with one or multiple processes, and each process may be single-threaded or multi-threaded. The runtime environments 202-204 of the distributed runtime environment 200 may execute on the same or multiple computing devices and/or computer systems, which may include virtual computer systems. In some examples, the runtime environments 202-204 may be distributed across a network at one or more network locations, examples of which are described in greater detail hereinafter.

FIG. 2B is a block diagram illustrating multiple instances of a component executing in a runtime environment in an example embodiment. A runtime environment 250 may execute one or multiple instances 218a-218b of a particular component in the same runtime environment 250 in one or multiple processes. In some examples, the runtime environment 250 and/or a distributed runtime environment including the runtime environment 250 makes and/or carries out a determination to execute multiple instances 218a-218b of the particular component.

FIG. 2C is a block diagram illustrating multiple instances of a component executing in a distributed runtime environment in an example embodiment. In some examples, the distributed runtime environment 200 may execute one or more instances 218c-218d of a particular component in the a plurality of runtime environments 250. In some examples, the distributed runtime environment 200 makes and/or carries out a determination to execute multiple instances 218a-218b of the particular component.

Message Queue System

FIG. 3 is a block diagram illustrating a message queue system for use with an application comprising components executable in a distributed runtime environment in an example embodiment. One or more elements of FIG. 3 may have one or multiple properties of the elements described with respect to one or more other figures, such as but not limited to FIGS. 2A-2D.

A distributed runtime environment 300 implements and/ or uses a message queue system 332 for intra-application communication when component instances 310-326 of an application are distributed across a plurality of runtime environments 302-306. The message queue system 332 enables communication between component instances 310-326 when the one or more runtime environments 302-306 are on different computer systems, computing devices, and/ or network locations.

The distributed runtime environment 300 includes a first runtime environment 302 that executes a first subset of the component instances 310-318 of the application, a second runtime environment 304 that executes a second subset of the component instances 320-322, 326 of the application, and a third runtime environment 306 that executes a third subset of the component instances 324 of the application. The distributed runtime environment 300 may make the determination to split the execution of the application across multiple runtime environments 302-306. The distributed runtime environment 300 may make the determination before executing the application and/or during the execution of the application.

The distributed runtime environment 300 may make the determination to implement and/or use the message queue system 332. The distributed runtime environment 300 may make the determination before executing the application and/or during the execution of the application. In some examples, the distributed runtime environment 300 monitors one or more execution metrics related to the execution of the application during execution. As an alternative or addition, the distributed runtime environment 300 may monitor one or more network metrics related to communication between component instances 310-324 executing in runtime environments 302-306 that are separated by a network. The distributed runtime environment 300 may dynamically make and/ or carry out a determination to use the message queue system 332 and/or change the usage of message queue system 332 for communications between a particular set of component instances 310-324 based on the one or more execution metrics and/or network metrics.

The distributed runtime environment 300 may use the message queue system 332 and make determinations on the usage thereof for communications over a particular link between components. For example, the distributed runtime environment 300 may use the message queue system 332 to handle a link between component instance 322 and component instance 324.

As an addition or alternative, the distributed runtime environment 300 may use the message queue system 332 and make determinations on the usage thereof for communications between a particular set of runtime environments 302-306 executing the application. In some examples, the distributed runtime environment 300 utilizes the message queue system 332 on a directional pairwise basis. For example, the distributed runtime environment 300 may use the message queue system 332 for all communications from the subset of component instances 310-318 executing in runtime environment 302 to the subset of component instances 320-322. The distributed runtime environment 300 may determine to use and/or change the usage of the message queue system 332 for these communications between runtime environment 302 and runtime environment 304 independently from the usage of the message queue system 332 for other directional communications between the runtime environments 302-306 of the distributed runtime environment 300.

In some examples, the message queue system 332 includes a message queue server for handling asynchronous messages. The message queue server may 300 may execute in one or more of the plurality of runtime environments 302-306 executing the component instances 3010-326 of the application, one or more additional runtime environments of the distributed runtime environment 300, or independently of the distributed runtime environment 300. In some examples, the message queue system is deployed on a computer system that is remote to one or more of the plurality of runtime environments 302-306, such as a data center, cloud infrastructure and/or service, an end-user device, or other computer system.

In some examples, the distributed runtime environment 300 may execute one or multiple instances of a component and/or a group of components as workers on the receiving end of a message queue implemented by the message queue system 332. For example, the distributed runtime environment 300 may execute multiple instances of a component in one or more runtime environments at a network location that is remote from a runtime environment that sends communications to other runtime environments over the message queue system 332.

The distributed runtime environment 300 may be configured to dynamically implement and/or use the message queue system 332 without requiring any changes to components of the application, such as rewriting and/or recompiling the underlying code and/or control flow configuration.

Intra-application orchestration

Figure 4A:
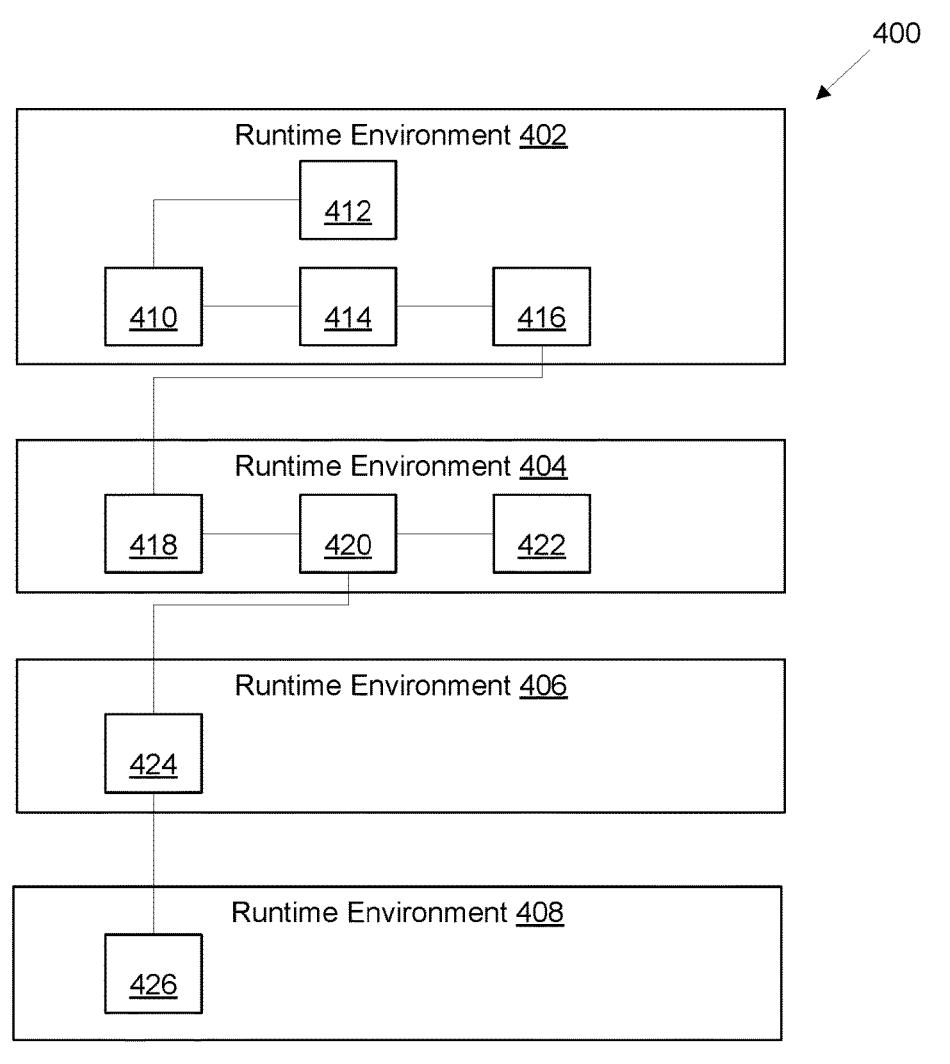
FIGS. 4A-4B are block diagrams illustrating intra-application network orchestration for an application comprising components executable in a distributed runtime environment in an example embodiment.
Figure 4B:
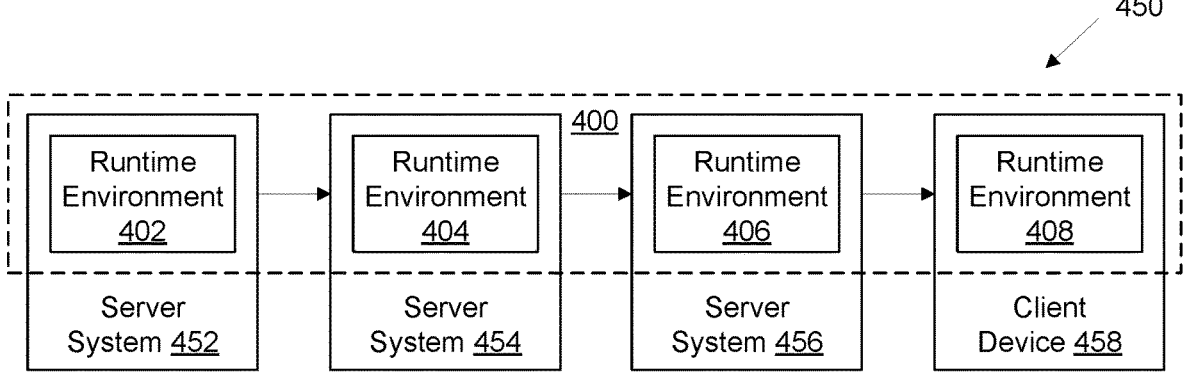

FIGS. 4A-4B are block diagrams illustrating network orchestration for an application comprising components executable in a distributed runtime environment in an example embodiment. One or more elements of FIGS. 4A-4B may have one or multiple properties of the elements described with respect to one or more other figures, such as but not limited to FIG. 2.

FIG. 4A is a block diagram illustrating intra-application network orchestration for an application comprising components executable in a distributed runtime environment in an example embodiment. A distributed runtime system 400 includes a plurality of runtime environments 402-408 executing over a network. The runtime environments 402-408 of the distributed runtime environment 400 may communicate to function as a cluster, but operate independently from each other. The runtime environments 402-408 of the distributed runtime environment 400 may be isolated and self-contained.

The distributed runtime environment 400 executes a plurality of component instances 410-426 of an application. That is, the distributed runtime environment 400 may execute subsets of component instances 410-426 in a plurality of runtime environments 402-408. The plurality of runtime environments 402-408 may run on different computer systems. A first runtime environment 402 executes a first subset of component instances 412-416. A second runtime environment 404 executes a second subset of component instances 418-422. A third runtime environment 406 executes a third subset of component instances 424. A fourth runtime environment 408 executes a fourth subset of component instances 412-416. While four runtime environments 402-408 are shown, the distributed runtime environment 400 may include any number of runtime environments 402-408 that each execute a subset of the component instances 410-426 of the application.

A subset of component instances executed by a particular runtime environment may include one, multiple, and/or all component instances 410-426 corresponding to the components of the application. In some examples, the distributed runtime environment 400 orchestrates the execution of the component instances 410-426 of the application across the plurality of runtime environments 402-408, computer systems, and/or network locations. For example, the distributed runtime environment 400 may coordinate and/or otherwise manage dependencies, communications, and other aspects related to the execution of the application between components. The distributed runtime environment 400 may orchestrate the execution of the component instances 410-426 based on the control flow configuration of the application, such as by loading and/or maintaining control flow data describing one or more links between the component instances 410-426.

In some examples, the distributed runtime environment 400 determines one or multiple aspects regarding how the component instances 410-426 of the application are distributed across the distributed runtime environment 410-426, such as but not limited to how many runtime environments 402-408 will execute the application, which runtime environments 402-408 will execute component instances 410-426, how to distribute the component instances 410-426 of the application across the plurality of runtime environments 402-408, where to run one or more of the runtime environments 402-408 of the distributed runtime environment 200 (e.g., a network location, computer system, and/or computing device), whether to execute one or multiple instances of any particular component of the application, whether to use a message queue system, and/or any other aspect regarding how the application is distributed across the distributed runtime environment 400. The distributed runtime environment 400 may make such determinations before executing the application and/or during the execution of the application. The distributed runtime environment 400 may be configured to make and/or implement such determinations without requiring any changes to components of the application, such as rewriting and/or recompiling the underlying code and/or control flow configuration.

FIG. 4B is a block diagram illustrating a computer system 450 running a distributed runtime environment comprising a plurality of runtime environments at a plurality of network locations in an example embodiment. The computer system 450 includes a plurality of server systems 452-456 and a client device 458. A first runtime environment 402 of the distributed runtime environment 400 runs on a first server system 452 at a first network location. A second runtime environment 404 of the distributed runtime environment 400 runs on a second server system 454 at a second network location. A third runtime environment 406 of the distributed runtime environment 400 runs on a third server system 456 at a third network location. A fourth runtime environment 408 of the distributed runtime environment 400 runs on a client device 458 at a fourth network location.

The first server system 402, second server system 404 and third server system 406 may include one or more computer systems in an edge computing architecture. For example, the first server system 452 may include a main data center, the second server system 456 may include a regional data center, and the third server system may include an edge node. The distributed runtime environment 400 may perform network orchestration, such as by determining the network locations and/or server systems 452-456 to use to execute the application and/or determining how to distribute the plurality of component instances 410-426 across a plurality of runtime environments 402-408 at the server systems 452-456 and/or a client device 458. In some examples, the distributed runtime environment 400 performs network orchestration in response to a request from a client device 458 to access the application.

In some examples, a top-level component, such as an input component of the application, is assigned to the first server system 452, and the runtime environment 402 at the first server system determines the assignment of components across the plurality of runtime environments 402-408 of the computer system 400. In some examples, the distributed runtime environment 400 may determine that a particular server system 452-456, runtime environment 402-406, and/or or network location will not participate in a particular execution of the application.

Dynamic Network-Aware Orchestration

FIGS. 5A-5B are block diagrams illustrating intra-application network orchestration in a distributed runtime environment executing across a computer system in an example embodiment. One or more elements of FIGS. 5A-5B may have one or multiple properties of the elements described with respect to one or more other figures, such as but not limited to FIGS. 4A-4B.

FIG. 5A is a block diagram illustrating the execution of an application requested by a first client device 558. The computer system 500 includes a plurality of server systems 552-556 and a client device 558 connected by one or more networks. The plurality of server systems 552-556 includes a main data center server system 552, a regional data server system 554, and an edge node server system 556, which are arranged in an edge computing network architecture. The server systems 552-556 provide the application to one or more client devices, including a first client device 558. A distributed runtime system 510 executes the application by executing component instances 510a-524a corresponding to components of the application in a plurality of runtime environments 502a-508a running at the server systems 552-556 and the first client device 558. In some examples, the distributed runtime system 510 may manage multiple executions of the application.

The distributed runtime system 510a performs dynamic network orchestration by determining a first assignment of the plurality of components to server systems 552-556 and the first client device 558. The distributed runtime system 510a may perform dynamic network orchestration on a client-by-client basis. In some examples, the distributed runtime system 510a obtaining a set of one or more properties corresponding to the first client device 558 and determines the first assignment based on the set of properties, such as but not limited to one or more hardware properties, software properties, and/or network properties associated with the first client device 558. For example, when a first client device 558 has insufficient memory resources and/or processing capability to execute a particular component, the distributed runtime system 510a may assign execution of the particular component (e.g., component instance 522a) to a runtime environment (e.g., runtime environment 506a) running at a server system (e.g., edge node server system 556a).

In some examples, the set of properties corresponding to the client devices 558-560 includes one or more resource metrics describing one or more computational resources of the client device, and the distributed runtime environment 510 determines an assignment of components based on the one or more resource metrics. As an alternative or addition, the set of properties corresponding to the client devices 558-560 may include a user-agent string. As an alternative or addition, the distributed runtime system 510a may determine the set of one or more properties corresponding to one or more client devices 558-560 dynamically, such as based on computed information during execution of code. The code may be one or more component instances and/or test code configured to gather data regarding the execution of code at a client device 558-560. For example, the distributed runtime system 510a may make an assignment and/or a reassignment based on the client device 558-560 entering a lower power mode, losing network connectivity, having an increase in other computational load, or any other property that can be detected based on data describing the execution of code at the client device 558-560.

In some examples, the distributed runtime system 510a may obtain one or properties corresponding to one or of the server systems 552-556 and/or determine the first assignment based on the set of properties thereof. The distributed runtime system 510a may use one or more techniques described above (with respect to obtaining a set of properties for a client device 558-560) to obtain a set of properties for any server system 552-556. For example, if one of the server systems 552-556, such as the edge node server system 556, includes a plurality of computer systems deployed at a plurality of network locations, the distributed runtime system 510a may obtain one or more properties corresponding to a specific virtual computer, computing device, and/or network location at which the runtime environment 506a is running and/or will run.

For example, in response to the first client device 558 requesting access to the application, the distributed runtime environment 510a may execute: a subset of components assigned to the main data center server system 552 as component instances 510a-514a executing in a runtime environment 502a at the main data center server system 552; a subset of components assigned to the regional data center server system 554 as component instances 516a-518a executing in a runtime environment 504a at the regional data center server system 554; a subset of components assigned to the edge node server system 556 as component instances 520a-522a executing in a runtime environment 506a at the edge node server system 556; and a subset of components assigned to the first client device 558 as component instance 524a executing in a runtime environment 508a at the first client device 558.

FIG. 5B is a block diagram illustrating the execution of the same application requested by a second client device 560. The distributed runtime system 510b performs dynamic network orchestration by determining a second assignment of the plurality of components to server systems 552-556 and the second client device 560. For example, the distributed runtime system 510b may obtain a set of properties corresponding to the second client device 560 and determines the second assignment based on the set of properties. For example, when the second client device 560 has sufficient memory resources and/or processing capability, the distributed runtime system 510b may assign certain execution of a particular component (e.g., component instance 522b) to the runtime environment 508b running at the second client device 560.

In response to the second client device 560 requesting access to the application, the distributed runtime environment 510b may execute: a subset of components assigned to the main data center server system 552 as component instances 510b-512b executing in a runtime environment 502b at the main data center server system 552; a subset of components assigned to the regional data center server system 554 as component instances 514b-516b executing in a runtime environment 504b at the regional data center server system 554; a subset of components assigned to the edge node server system 556 as component instances 518b-520b executing in a runtime environment 506b at the edge node server system 556; and a subset of components assigned to the second client device 560 as component instance 524a executing in a runtime environment 508b at the second client device 560.

While FIGS. 5A-5B illustrate dynamic network-aware orchestration in an edge computing network architecture, the concepts described herein, including dynamic network orchestration on a client basis, may be applied to any network arrangement of server systems and/or client devices.

The decision on what components of the application to serve to a particular client device 508-510 can be made dynamically at runtime, such as based on the set of properties corresponding to the client device 508-510.

Example System

Figure 6:
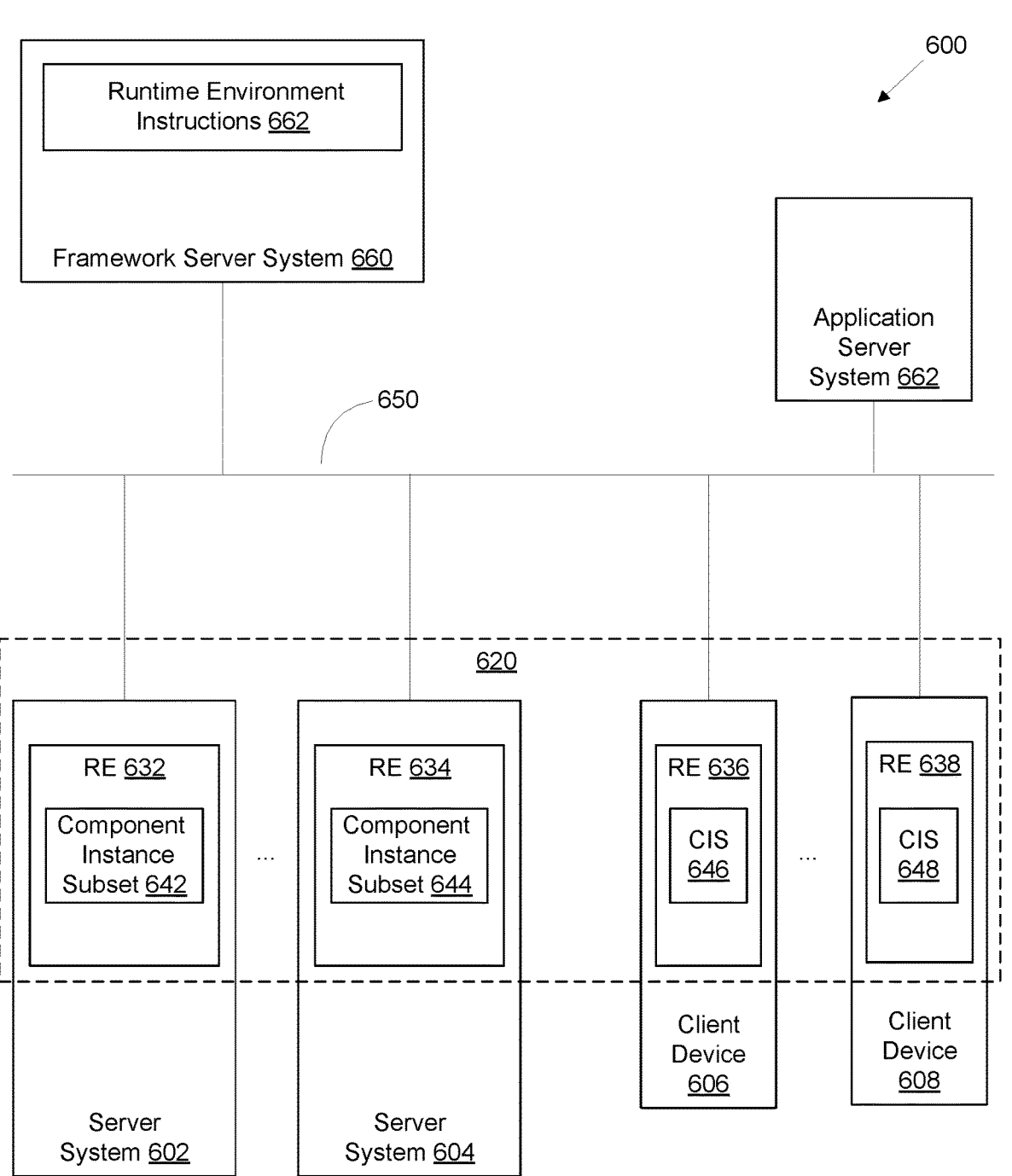
FIG. 6 is a block diagram illustrating a computer system for providing a distributed runtime environment in an example embodiment.

FIG. 6 is a block diagram illustrating a computer system for providing a distributed runtime environment in an example embodiment. One or more elements of FIG. 6 may have one or multiple properties of the elements described with respect to one or more other figures. The computer system 600 includes a plurality of server system/s 602-604 and a plurality of client device/s 606-608. The server system/s 602-604 and the client device/s 606-608 communicate over a network 650. The network 650 may include one or more local area networks (LANs) and/or one or more wide area networks, such as the Internet.

A distributed runtime environment 620 includes a plurality of runtime environments 632-638 that run on one or more server systems 602-604 and one or more client devices 606-608. Each runtime environment 632-638 executes a respective subset of component instances 642-648 corresponding to components of an application. The distributed runtime environment 620 may dynamically assign the components to be executed in the respective runtime environment 632-638. The client devices 606-608 may access the application, such as by submitting a request over the network 650.

In some examples, the computer system 600 includes an application server system 662. The application server system 662 may be configured to communicate over the network 650. In some examples, a request from a client device 606-608 is initially handled by the application server system 662, and the application server system 662 directs the request and/or issues an instruction to one or more component instances of the application executing in the distributed runtime environment 620. As an alternative or addition, the request may be initially handled by one or more component instances of the application. For example, one or more components of the application may implement the functionality of an application server.

In some examples, the computer system 600 includes a framework server system 660. The framework server system 660 may be configured to communicate over the network 650. The framework server system 660 may include resources that aid in the development of applications that are executable by the distributed runtime system 620. In some examples, the framework server system 660 hosts runtime environment instructions 662 that, when executed on a computer system, run an instance of the runtime environment 632-638 on the computer system.

Example Processes

FIG. 7 is a flow diagram of a process for executing an application in a distributed runtime environment in an example embodiment. Process 700 may be performed by one or more computing devices and/or processes thereof. For example, one or more blocks of process 700 may be performed by a computer system, such as but not limited to computer system 800. In some examples, one or more blocks of process 700 are performed by a distributed runtime environment (e.g., distributed runtime environment 200, 300, 400, 510, 620), such as by a server system executing a runtime environment thereof (e.g., server system 452-456, 552-456, 602-604). As an alternative or addition, one or more blocks of process 700 are performed by an application server system (e.g., application server system 662). Process 700 will be described with respect to distributed runtime environment 510, but is not limited to performance by distributed runtime environment 510.

At block 702, the distributed runtime environment 510 determines a set of properties corresponding to a first computer system requesting an application. In some examples, the first computer system is a client device. In some examples, the set of properties includes one or more resource metrics describing one or more computational resources of the first computer system. As an alternative or addition, the set of properties includes a user-agent string. The application comprises a plurality of components and a control flow configuration comprising a plurality of links, each link describing a connection between two or more components of the plurality of components. In some examples, each link identifies a first component of the plurality of components, an output of the first component, a second component, and an input of the second component of the plurality of components. In some examples, the plurality of components includes a plurality of WebAssembly modules in a WebAssembly binary format.

At block 704, the distributed runtime environment 510 determines a first assignment of the plurality of components to each of a plurality of computer systems including the first computer system based on the set of properties corresponding to the first computer system, such as but not limited to one or more resource metrics describing one or more computational resources of the first computer system, a user-agent string, and/or other properties. In some examples, determining the first assignment is based on analyzing the control flow configuration of the application.

At block 706, the distributed runtime environment 510 executes, in a first runtime environment at a first computer system of the plurality of server computer systems, a first subset of the plurality of components assigned to the first computer system in the first assignment. In some examples, executing the first subset of the plurality of components comprises triggering execution of the first subset of the plurality of components in the first runtime environment. In examples, one or more of the plurality of components assigned to the first computer system in the first assignment may remain unexecuted.

At block 708, the distributed runtime environment 510 executes, in a second runtime environment at a second computer system of the plurality of computer systems, a second subset of the plurality of components assigned to the second computer system in the first assignment. In some examples, executing the second subset of the plurality of components comprises triggering execution of the second subset of the plurality of components in the second runtime environment.

At block 710, the distributed runtime environment 510 executes, in a third runtime environment at a third computer system of the plurality of computer systems, a third subset of the plurality of components assigned to the third computer system in the first assignment. In some examples, executing the third subset of the plurality of components comprises triggering execution of the third subset of the plurality of components in the third runtime environment.

Implementation Mechanisms-Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field-programmable gate arrays (FPGAs) that are persistently programmed to perform the techniques. Alternatively and/or in addition, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, Internet of Things (IoT) devices, operational technology (OT) devices, networking devices, and/or any other device that incorporates hard-wired or program logic to implement the techniques.

Figure 8:
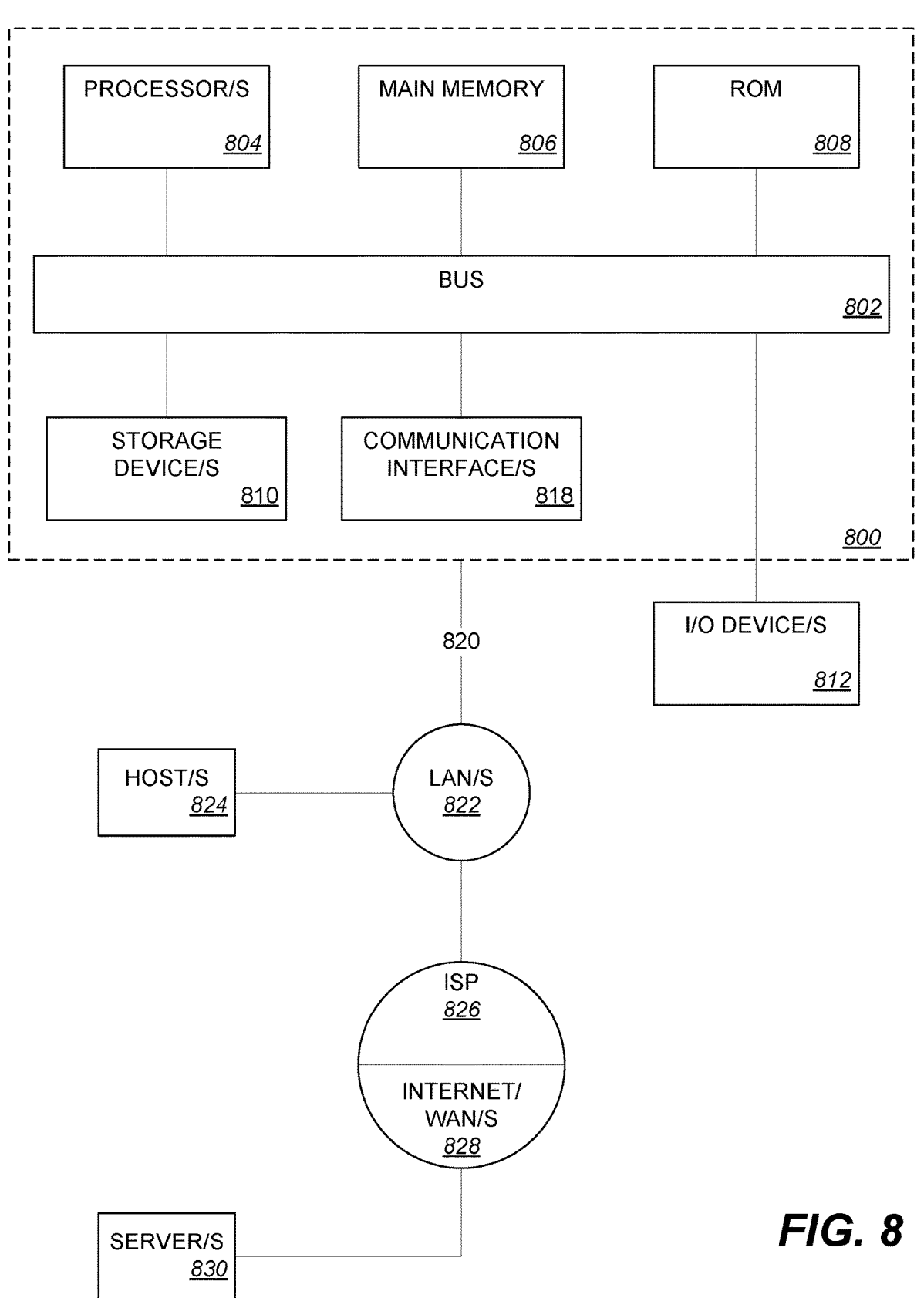
FIG. 8 is a block diagram illustrating a computer system upon which an embodiment may be implemented.

FIG. 8 is a block diagram illustrating a computer system upon which an embodiment may be implemented. The computer system 800 includes a bus 802 or other communication mechanism for communicating information, and one or more hardware processors 804 coupled with bus 802 for processing information, such as computer instructions and data. The hardware processor/s 804 may include one or more general-purpose microprocessors, graphical processing units (GPUs), coprocessors, central processing units (CPUs), and/or other hardware processing units.

The computer system 800 also includes one or more units of main memory 806 coupled to the bus 802, such as random-access memory (RAM) or other dynamic storage, for storing information and instructions to be executed by the processor/s 804. Main memory 806 may also be used for storing temporary variables or other intermediate information during execution of instructions to be executed by the processor/s 804. Such instructions, when stored in non-transitory storage media accessible to the processor/s 804, turn the computer system 800 into a special-purpose machine that is customized to perform the operations specified in the instructions. In some embodiments, main memory 806 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 800 may further include one or more units of read-only memory (ROM) 808 or other static storage coupled to the bus 802 for storing information and instructions for the processor/s 804 that are either always static or static in normal operation but reprogrammable. For example, the ROM 808 may store firmware for the computer system 800. The ROM 808 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 810, such as a magnetic disk or optical disk, is provided and coupled to the bus 802 for storing information and/or instructions. The storage device/s 810 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 800 may be coupled via the bus 802 to one or more input/output (I/O) devices 812. For example, the I/O device/s 812 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 812 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 804 and for controlling cursor movement on another I/O device (e.g. a display). A cursor control device typically has at degrees of freedom in two or more axes, (e.g. a first axis x, a second axis y, and optionally one or more additional axes z), that allows the device to specify positions in a plane. In some embodiments, the one or more I/O device/s 812 may include a device with combined I/O functionality, such as a touch-enabled display.

Other I/O device/s 812 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 804 over the bus 802.

The computer system 800 may implement the techniques described herein using customized hard-wired logic, one or more ASICs or FPGAs, firmware, and/or program logic which, in combination with the computer system causes or programs, causes computer system 800 to be a special-purpose machine. According to one embodiment, the techniques herein are performed by the computer system 800 in response to the processor/s 804 executing one or more sequences of one or more instructions contained in main memory 806. Such instructions may be read into main memory 806 from another storage medium, such as the one or more storage device/s 810. Execution of the sequences of instructions contained in main memory 806 causes the processor/s 804 to perform the process steps described herein. In alternative embodiments, hard-wired circuitry may be used in place of or in combination with software instructions.

The computer system 800 also includes one or more communication interfaces 818 coupled to the bus 802. The communication interface/s 818 provide two-way data communication over one or more physical or wireless network links 820 that are connected to a local network 822 and/or a wide area network (WAN), such as the Internet. For example, the communication interface/s 818 may include an integrated services digital network (ISDN) card, cable modem, satellite modem, or a modem to provide a data communication connection to a corresponding type of telephone line. Alternatively and/or in addition, the communication interface/s 818 may include one or more of: a local area network (LAN) device that provides a data communication connection to a compatible local network 822; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network; and other networking devices that establish a communication channel between the computer system 800 and one or more LANs 822 and/or WANs.

The network link/s 820 typically provides data communication through one or more networks to other data devices. For example, the network link/s 820 may provide a connection through one or more local area networks 822 (LANs) to one or more host computers 824 or to data equipment operated by an Internet Service Provider (ISP) 826. The ISP 826 provides connectivity to one or more wide area networks 828, such as the Internet. The LAN/s 822 and WAN/s 828 use electrical, electromagnetic, or optical signals that carry digital data streams. The signals through the various networks and the signals on the network link/s 820 and through the communication interface/s 818 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may initially be carried on a magnetic disk or solid-state drive of a remote computer. The remote computer can load the instructions into its main memory 806 and send the instructions over a telecommunications line using a modem. A modem local to the computer system 800 can receive the data on the telephone line and use an infra-red transmitter to convert the data to an infra-red signal. An infra-red detector can receive the data carried in the infra-red signal and appropriate circuitry can place the data on the bus 802. The bus 802 carries the data to main memory 806, from which the processor 804 retrieves and executes the instructions. The instructions received by main memory 806 may optionally be stored on the storage device 810 either before or after execution by the processor 804.

The computer system 800 can send messages and receive data, including program code, through the network(s), the network link 820, and the communication interface/s 818. In the Internet example, one or more servers 830 may transmit signals corresponding to data or instructions requested for an application program executed by the computer system 800 through the Internet 828, ISP 826, local network 822 and a communication interface 818. The received signals may include instructions and/or information for execution and/or processing by the processor/s 804. The processor/s 804 may execute and/or process the instructions and/or information upon receiving the signals by accessing main memory 806, or at a later time by storing them and then accessing them from the storage device/s 810.

OTHER ASPECTS OF DISCLOSURE

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

What is claimed is:

1. A method for executing an application in a distributed runtime environment, the method comprising:

maintaining, for an application, a plurality of WebAssembly components, and a control flow configuration comprising a plurality of links describing a connection between two or more components of the plurality of components;

at runtime, performing a first dynamic network orchestration across a first plurality of computer systems including a first computer system requesting the application by:

obtaining a first set of properties of the first computer system, based on the first set of properties and the control flow configuration, determining a first assignment of the plurality of components to each of a first plurality of runtime environments executing at the first plurality of computer systems, and executing at least one instance of each of the plurality of components in the first plurality of runtime environments based on the first assignment; and at runtime, performing a second dynamic network orchestration across a second plurality of computer systems including a second computer system requesting the application by:

obtaining a second set of properties of the second computer system, based on the second set of properties and the control flow configuration, determining a second assignment of the plurality of components to each of a second plurality of runtime environments executing at the second plurality of computer systems, wherein at least one runtime environment of the second plurality of runtime environments executes a different subset of components than a runtime environment of the first assignment, and executing at least one instance of each of the plurality of components in the second plurality of runtime environments based on the second assignment;

wherein the first plurality of runtime environments and the second plurality of runtime environments are configured to process the control flow configuration to generate control flow data and manage, based on the control flow data, communications, execution flow, and dependencies between instances of the plurality of components executing across the first plurality of computer systems and the second plurality of computer systems;

wherein the first plurality of runtime environments and the second plurality of runtime environments are configured such that no changes to the control flow configuration or the plurality of components are necessary to perform dynamic network orchestration with different assignments;

wherein the method is performed by one or more processors.

2. The method of claim 1, further comprising:

during execution of the application, dynamically reassign one or more components from a first runtime environment of the first plurality of runtime environments to execute in a second runtime environment of the first plurality of runtime environments without requiring any changes to other components of the application.

3. The method of claim 2, wherein determining the one or more additional properties at the first computer system comprises executing test code configured to gather data regarding the execution of code at the first computer system.

4. The method of claim 1, wherein the first computer system is a client device and the second computer system is a client device.

5. The method of claim 1, wherein determining the first assignment is based on analyzing the control flow configuration of the application.

6. The method of claim 1, wherein:

the set of properties includes one or more resource metrics describing one or more computational resources of the first computer system; and determining the first assignment is based on the one or more resource metrics.

7. The method of claim 1, wherein:

the set of properties includes a user-agent string; and determining the first assignment is based on the user-agent string.

8. The method of claim 1, wherein the plurality of WebAssembly components comprises at least one of:

a plurality of WebAssembly modules in a WebAssembly binary format;

a plurality of WebAssembly components; and a plurality of fractional parts of WebAssembly binaries.

9. The method of claim 1, wherein each link identifies a first component of the plurality of WebAssembly components, an output of the first component, a second component of the plurality of components, and an input of the second component.

10. A non-transitory computer-readable medium storing instructions that, when executed by one or more processors, cause the one or more processors to:

maintain, for an application, a plurality of WebAssembly components, and a control flow configuration comprising a plurality of links describing a connection between two or more components of the plurality of components;

at runtime, perform dynamic network orchestration across a first plurality of computer systems including a first computer system requesting the application by:

obtaining a first set of properties of the first computer system;

based on the first set of properties and the control flow configuration, determining a first assignment of the plurality of components to each of a first plurality of runtime environments at the first plurality of computer systems, and trigger execution of at least one instance of each of the plurality of components in the first plurality of runtime environments based on the first assignment; and at runtime, performing dynamic network orchestration across a second plurality of computer systems including a second computer system requesting the application by:

obtaining a second set of properties of the second computer system, based on the second set of properties and the control flow configuration, determining a second assignment of the plurality of components to each of a second plurality of runtime environments at the second plurality of computer systems, wherein at least one runtime environment of the second plurality of runtime environments executes a different subset of components than a runtime environment of the first assignment, and trigger execution of at least one instance of each of the plurality of components in the second plurality of runtime environments based on the second assignment;

wherein the first plurality of runtime environments and the second plurality of runtime environments are configured to process the control flow configuration to generate control flow data and manage, based on the control flow data, communications, execution flow, and dependencies between instances of the plurality of components executing across the first plurality of computer systems and the second plurality of computer systems;

wherein the first plurality of runtime environments and the second plurality of runtime environments are configured such that no changes to the control flow configuration or the plurality of components are necessary to perform dynamic network orchestration with different assignments.

11. The non-transitory computer-readable medium of claim 10, wherein the instructions, when executed by the one or more processors, cause the one or more processors to:

during execution of the application, dynamically reassigning one or more components from a first runtime environment of the first plurality of runtime environments to execute in a second runtime environment of the first plurality of runtime environments without requiring any changes to other components of the application.

12. The non-transitory computer-readable medium of claim 11, wherein determining the one or more additional properties at the first computer system comprises executing test code configured to gather data regarding the execution of code at the first computer system.

13. The non-transitory computer-readable medium of claim 10, wherein the first computer system is a client device and the second computer system is a client device.

14. The non-transitory computer-readable medium of claim 10, wherein determining the first assignment is based on analyzing the control flow configuration of the application.

15. The non-transitory computer-readable medium of claim 10, wherein:

the set of properties includes one or more resource metrics describing one or more computational resources of the first computer system; and determining the first assignment is based on the one or more resource metrics.

16. The non-transitory computer-readable medium of claim 10, wherein:

the set of properties includes a user-agent string; and determining the first assignment is based on the user-agent string.

17. The non-transitory computer-readable medium of claim 10, wherein the plurality of WebAssembly components comprises at least one of:

a plurality of WebAssembly modules in a binary format;

a plurality of WebAssembly components; and a plurality of fractional parts of WebAssembly binaries.

18. The non-transitory computer-readable medium of claim 10, wherein each link identifies a first component of the plurality of WebAssembly components, an output of the first component, a second component of the plurality of components, and an input of the second component.

* * * * *